(12) United States Patent
Rössl

(10) Patent No.: US 12,249,257 B2
(45) Date of Patent: Mar. 11, 2025

(54) ELECTRONIC SHELF-LABEL SYSTEM WITH A CONTACT-FREE SHELF-LABEL POWER AND/OR DATA SUPPLY

(71) Applicant: VusionGroup GmbH, Fernitz-Mellach (AT)

(72) Inventor: Andreas Rössl, Graz (AT)

(73) Assignee: VusionGroup GmbH, Fernitz-Mellach (AT)

( * ) Notice: Subject to any disclaimer, the term of this patent is extended or adjusted under 35 U.S.C. 154(b) by 415 days.

(21) Appl. No.: 17/635,931

(22) PCT Filed: Aug. 19, 2019

(86) PCT No.: PCT/EP2019/072141
§ 371 (c)(1),
(2) Date: Feb. 16, 2022

(87) PCT Pub. No.: WO2021/032278
PCT Pub. Date: Feb. 25, 2021

(65) Prior Publication Data
US 2022/0335862 A1    Oct. 20, 2022

(51) Int. Cl.
*G09F 3/18* (2006.01)
*G09F 3/20* (2006.01)

(52) U.S. Cl.
CPC .............. *G09F 3/204* (2013.01); *G09F 3/208* (2013.01)

(58) Field of Classification Search
CPC ........ G09F 3/204; G09F 3/208; G06K 7/0008
See application file for complete search history.

(56) References Cited

U.S. PATENT DOCUMENTS 5,537,126 A * 7/1996 Kayser ................... G06Q 30/02
340/5.91
6,181,299 B1 * 1/2001 Frederick .......... H02J 13/00016
345/2.1
(Continued)

FOREIGN PATENT DOCUMENTS

WO        WO-9942981 A1 * 8/1999 ........... A47F 5/0068

OTHER PUBLICATIONS

International search report from WO Publication WO 2021/032278 A1 the Parent of the present applicaiton.
(Continued)

*Primary Examiner* — Cassandra Davis
(74) *Attorney, Agent, or Firm* — Studebaker & Brackett PC

(57) ABSTRACT

Shelf rail for an electronic shelf-label system, comprising a first fastening structure for fastening at least one electronic shelf label that can be supplied with power in a contact-free manner, wherein the first fastening structure comprises a wall running between a head area and a foot area of the shelf rail with a wall front side and a wall back side, which defines a shelf-label plane with its wall front side for the positioning of the at least one shelf label along the wall, and wherein the shelf rail on the wall back side comprises at least one second fastening structure for attaching at least one conductor loop on a conductor-loop plane, wherein the conductor-loop plane is aligned parallel to the shelf-label plane and runs at the defined first distance from the shelf-label plane, and wherein the shelf rail comprises a third fastening structure for fastening a conductive structure.

20 Claims, 6 Drawing Sheets

(56) References Cited

U.S. PATENT DOCUMENTS

| | | | | |
|---|---|---|---|---|
| 2001/0048057 A1* | 12/2001 | Heisler | ................... | G09F 3/204 |
| | | | | 248/220.22 |
| 2001/0048257 A1 | 12/2001 | Heisler | | |
| 2002/0146282 A1* | 10/2002 | Wilkes | .................... | G09F 3/204 |
| | | | | 403/331 |
| 2015/0146018 A1* | 5/2015 | Kayser | ............... | H04N 1/00204 |
| | | | | 348/333.01 |
| 2018/0268745 A1* | 9/2018 | de Haas | ............... | H01R 25/142 |
| 2022/0036768 A1* | 2/2022 | Cho | ......................... | G09F 9/30 |
| 2024/0185744 A1* | 6/2024 | Rossl et al. | ............. | G09F 3/208 |

OTHER PUBLICATIONS

An Office Action mailed by China National Intellectual Property Administration on Aug. 17, 2024, which corresponds To Chinese Patent Application No. 201980099578.8 and is related to U.S. Appl. No. 17/635,931; with English language translation.

* cited by examiner

ELECTRONIC SHELF-LABEL SYSTEM WITH A CONTACT-FREE SHELF-LABEL POWER AND/OR DATA SUPPLY

CROSS-REFERENCE TO RELATED APPLICATIONS

This is a 35 U.S.C. 371 National Stage Patent Application of International Application No. PCT/EP2019/072141, filed Aug. 19, 2019 which is hereby incorporated by reference in its entirety.

TECHNICAL FIELD

The invention relates to an electronic shelf-label system with a power supply to electronic shelf labels via a shelf rail.

BACKGROUND

An electronic shelf-label system for displaying information with the aid of electronic shelf-label displays, hereinafter referred to in short as an ESL system, wherein ESL stands for "Electronic Shelf Label", with a power supply via a shelf rail is known, for example, from the international patent application WO 2017/153481 A1. In this well-known ESL system, a shelf rail to which the ESLs are attached is equipped with electrical conductor paths connected to a power supply unit for the electrical supply of the ESLs. The ESLs have spring-loaded contacts on their back side that are used to contact the conductor paths to electrically connect the ESLs to the power supply unit.

However, the well-known power supply is relatively expensive because a plurality of mechanical components, particularly individual ones, must be provided in each ESL and in every shelf rail. These mechanical components are subject to natural wear and tear. In addition, the mechanical components can be dirtied or even damaged if handled improperly. This can lead to malfunctions during operation. The mechanical components are also associated with considerable additional production and maintenance effort, which is necessary to avoid the aforementioned problems during operation. With the well-known system, there is also the constraint that the ESLs cannot be positioned or moved randomly along the shelf rail.

The object of the invention is to provide an improved ESL system in which the aforementioned problems are overcome.

SUMMARY OF THE INVENTION

This task is achieved by means a shelf rail for an electronic shelf-label system, wherein the shelf rail comprises a first fastening structure for the attachment of at least one electronic shelf label, in particular an electronic shelf-label display, that is suppliable with power in a contactless way, wherein the first fastening structure comprises a wall running between a head area and a foot area of the shelf rail with a wall front side and a wall back side, which, with its wall front, is used to define a shelf-label plane for the positioning of the at least one shelf label along the wall, and wherein the shelf rail on the wall back side comprises at least one second fastening structure, in particular a tubular or channel-shaped one, for fastening at least one conductor loop on a conductor-loop plane, wherein the conductor-loop plane is aligned parallel to the shelf-label plane and runs at the defined first distance from the shelf-label plane, and wherein the shelf rail comprises a third fastening structure for fastening a conductive structure, in particular a planar structure, at a defined second distance from the conductor-loop plane.

Furthermore, the task is achieved by means of an electronic shelf-label system comprising at least one shelf rail according to the invention and which comprises at least one electronic shelf label, which is attached to the shelf-label plane with the aid of the first fastening structure and which comprises a first electronic circuit connected to a coupling coil for its contact-free power supply, and which comprises at least one conductor loop fixed in the conductor-loop plane by means of the second fastening structure, and which comprises a supply device inserted into the shelf rail, which is electrically connected to the said at least one conductor loop in a conductive manner via its conductor-loop connections, wherein the supply device comprises a second electronic circuit for generating an alternating field for the purpose of establishing an inductive coupling between the conductor loop and the coupling coil of the shelf label, and which comprises a conductive structure fixed by means of the third fastening structure, wherein the second electronic circuit is electronically tuned to the environmental conditions defined by the conductive structure.

The measures according to the invention have the advantage that the power supply of the shelf label is completely free of mechanical contacts and the problems associated therewith. Thereby, the system can be manufactured more cost-effectively and can be operated in a de facto maintenance-free manner due to avoided mechanical components, particularly those that are prone to maintenance.

The shelf rail according to the invention is an essential element because it ensures the precision of the positioning of the shelf label in relation to the conductor loop that is necessary for a contact-free electrical supply of the shelf label by determining, on the one hand the shelf-label plane and the conductor-loop plane, as well as the orientation of the planes with relation to one another, and by precisely specifying the prevailing first distance in between on the other. These parameters (parameter ranges) were identified by the applicant as significant to ensure a contact-free power supply of the shelf label and subsequently also to carry out contact-free communication with the shelf label supplied with power in a contact-free manner.

Furthermore, the applicant comprises determined that the environment of the shelf rail comprises an influence, which must not be ignored, on the quality of the contact-free power supply and also on the quality of contact-free communication. This influence can be summarized under the term "metallic load", which occurs in a shelf-label application, e.g., through metal cans or other metallic objects positioned on a shelf, to the front edge of which the shelf rail is attached. But the shelf itself can also contribute to this metallic load, which can vary from shelf to shelf on the premises of a business.

It should be noted that, for contact-free power supply on the side of the second electronic circuit of the supply device, an antenna configuration is used that comprises at least the conductor loop and a connected adaptation network, wherein the conductor loop together with the adaptation network forms an antenna oscillating circuit of the supply device. Connected to the adaptation network, the second electronic circuit additionally comprises other electronic components that are required for implementing contact-free power transfer. These other components can be analogue and/or digital in nature. For example, in an implementation based on an RFID or NFC reader, they can comprise an EMC filter (EMC stands for "electromagnetic compatibility") and an RFID or NFC-reader IC. Thereby, an alternating magnetic field is used for inductive coupling to the shelf label.

Due to the inductive coupling of the conductor loop of the supply device with the coupling coil of the shelf label, there is a change in the quality of the oscillating circuit, wherein the quality comprises, among other things, an influence on the power transmission range and the bandwidth of data transmission. If environmental effects, such as the metallic load, are to be ignored, the adaptation network of the second electronic circuit of the supply device, adapted to the influence of the first electronic circuit of the shelf label, can essentially create idealized conditions so that power transmission and data transmission can be carried out without any problems.

However, in reality, since unpredictable metallic loads can usually even occur at different locations on the premises of a supermarket, which are not only static but also subject to temporal dynamics (adding or removing metallic objects on the shelves or changing the shelf arrangement as such), it can lead to a lasting disruption of the power supply of individual shelf labels or entire groups of shelf labels and, as a result, there are also temporary disruptions in data transmission or a complete breakdown of data transmission with the affected shelf labels. An individual adaptation of the oscillating circuit to the respective situation would entail a considerable additional effort in the second electronic circuit as well as in the planning and operational implementation during ongoing operation of the shelf-label system. From a technical point of view, metal and ground surfaces near the conductor loop result in a burdening and de-tuning of the antenna configuration. When coupling the antenna configuration with a metal surface, eddy currents are induced in the metal and the metal acts like a short circuit on the magnetic field.

However, the shelf rail according to the invention also offers a solution for the problem of the unpredictable metallic load because it comprises a third fastening structure, with the aid of which a conductive structure—as a planned and thus predictable metallic load—is essentially attachable to the back side of the shelf rail, or the shelf rail is attachable to the conductive structure if the conductive structure has previously been attached to a shelf for example.

The conductive structure can be, in the simplest case, a metal plate, which can be designed to be flat; however, in particular, it can be implemented as a mounting rail made of metal, which is common in the electronics industry. The use of a top-hat DIN rail, which is a mounting rail with a hat-like profile, is particularly favourable. Their angled or hat-brim-like protruding edges, which result in the hat-like profile, are particularly suitable for mechanically connecting to the shelf rail. A printed circuit board with a metallic coating across a large area, ideally covering the entire printed circuit board, is also possible. A metallically coated plastic plate or a composite plate can also be used. In the simplest case, for example, an aluminium sheet can be used as a metallic coating, but other metals are also possible. In addition, the conductive structure does not have to be fully formed. Strip-, lattice- or net-like formations can also be provided, which can then be formed or integrated in the coating or in the entire load-bearing structure of the conductive structure.

In contrast to the unpredictable metallic load, which is to be expected on the premises of a supermarket for example, the conductive structure now leads to a specified, i.e., defined, load on the oscillating circuit, which is essentially identical for all installed shelf rails and to which the adaptation network can now be easily tuned to ensure reliable operation through power supply and subsequently also data transmission. The necessary adjustment of the oscillating circuit can already be made during the circuit design or upon leaving the factory so that subsequent interventions and changes in the adaptation are unnecessary.

With the aid of the conductive structure held at a defined second distance from the conductor-loop plane, attenuation for the oscillating circuit is therefore deliberately accepted, but with the advantage that the shelf rail is essentially shielded from its environment and its contact-free operation can take place independently or essentially de-coupled from the background of the metallic load prevailing in a supermarket for example.

Also, a concrete specification of the material of the conductive parts of the conductive structure or generally of the conductive properties is not necessary in detail because it is basically sufficient that the conductive structure comprises such a conductivity that its effect on the oscillating circuit is predominate with relation to other metallic loads in the vicinity of the shelf rail, and thereby, the oscillating circuit can be adapted to the dominant attenuation or load. This creates a defined space, which is delimited by a constant defined attenuation (by the conductive structure) from the environment and its now negligibly small variable attenuations (by metallic goods for example). Thus, the background caused by other metallic loads can be ignored.

In summary, the measures according to the invention ensure that the operation of contact-free shelf labels on the shelf rail is made possible in the first place. For this purpose, defined geometrical as well as transmission technology framework conditions are created, wherein a reliable operation is only ensured in this combination.

Other especially favourable embodiments and further embodiments of the invention result from the dependent claims as well as the following description. Features of one claim category can be further developed in accordance with the features of the other claim category in such a way that the effects and advantages mentioned in connection with one claim category also exist for the other claim categories.

For example, the wall can have a fully solid surface. However, it can also be perforated, such as strip-shaped or net-shaped perforations, or also have round holes or otherwise shaped wall openings and the like to save wall material for example.

In accordance with a further aspect of the fastening of the conductive structure, the third fastening structure can be designed in such a way that the conductive structure is receivable with a height that covers at least the entire conductor loop, in particular with a height that corresponds approximately with the height of the wall measured between the head area and the foot area of the shelf rail. This enables an essentially full-surface shielding of all transmission-relevant components, such as the conductor loop itself and also of the components that are formed on the shelf label attached to the shelf rail.

Furthermore, it is favourable if the third fastening structure comprises two substructures, between which the conductive structure is receivable, wherein the first substructure runs along the head area of the shelf rail and the second substructure along the foot area of the shelf rail. This allows for the use of a conductive structure that essentially covers a large part of the back side of the shelf rail and for a non-positively-locked connection between the conductive structure at its upper and lower edges, i.e., at its outer edges, to the shelf label.

Another aspect concerns the manner of connection between the shelf label and the shelf rail, wherein the third fastening structure along the length of the shelf rail can be designed in such a way that the conductive structure is insertable laterally into the shelf rail or the conductive structure at its outer edges is snappable into the third fastening structure. In the second case, either the conductive structure itself or the shelf rail must be plastically deformable to an appropriate extent in order to enable snapping in.

It has proven to be particularly favourable if the third fastening structure is designed for holding a plate-shaped conductive structure, in particular one with protruding edges. This can be the already mentioned carrying rail or top-hat DIN rail, wherein the third fastening structure must of course have the appropriate form for (permanent) force-locking interaction with the offset edges of the top-hat DIN rail to take place.

In order to obtain shielding across a large area against an unknown metallic load behind the shelf rail, it has been proven to be favourable if the third fastening structure is designed for holding the conductive structure along the entire conductor loop, preferably along the entire shelf rail. A conductive structure that essentially covers much of the height of the back side of the shelf rail and also much of the length of the shelf rail, particularly where the conductor loop extends, forms an optimal shielding against an unknown metallic load. If a top-hat DIN rail is used as a conductive structure, it can be favourable in terms of shielding if the offset edges of the top-hat DIN rail are orientated towards the conductor loop, in particular, comprising the conductor loop orientated towards the head area and the foot area, which improves the shielding even more.

An electronic shelf label used in the shelf rail can provide a wide variety of functionalities or fulfil functions. The shelf label can be configured, for example, for measuring environmental parameters, such as for temperature or humidity measurement, or as an input element for receiving an input interaction of a user (e.g., capturing a fingerprint or a key operation) or as a display medium for presenting information to the user, namely as a shelf-label display, or be designed accordingly. In any case, the shelf label is designed in such a way that it can be attached to the present shelf rail and supplied there with power in the manner described in detail below.

The shelf label can have a proprietary interface for power transfer, which can only be used for this purpose. Preferably, however, the shelf label comprises a standardized power transmission interface, which can be formed, for example, in accordance with the RFID standard (RFID stands for Radio Frequency Identification and an applicable standard is, for example, ISO/IEC 18000, etc.). Being particularly preferred, however, the shelf label comprises an NFC interface for its contact-free power supply. This is associated with the advantage that this NFC interface can be used not only for local power transmission on the shelf or on the shelf rail but can also be used directly there for bidirectional contact-free communication. In particular, this avoids problems in radio traffic caused by other radio systems in a shop because they are usually located far away from the shelves where the shelf label is installed and therefore have little to no influence on the local power transmission as well as communication between the closely positioned communication partners directly on the shelf rail. NFC stands for Near Field Communication and the applicable standards are, for example, ISO/IEC 13157, -16353, -22536, -28361 etc.

In accordance with a preferred exemplary embodiment of the invention, the first electronic circuit together with its coupling coil realizes a first NFC interface for the shelf label, and the second electronic circuit with the associated conductor loop connected to it realizes a second NFC interface for the supply device. Here, the supply device exhibits the functionality of an NFC reader, i.e., a reader, and the shelf label comprises the functionality of an NFC-enabled transponder.

The shelf label, when configured as a shelf-label display, can have a power-saving display unit, such as an LCD display for example. In particular, however, the technology used is based on electronic ink or electronic paper technology. Thereby, such a display unit comprises a reflective screen, in technical jargon, also called electronic paper display, abbreviated EPD, and is implemented with the aid of "electronic paper"—in short "e-paper," also called "e-paper" or "e-ink". These terms essentially stand for the principle of an electrophoretic display, in which, positively charged white particles and negatively charged black particles are contained in a transparent viscous polymer for example. By briefly applying a voltage to electrodes between which the medium of particles and polymer is arranged, either the black particles are placed in front of the white particles in the direction of view or vice versa. This arrangement then remains for a relatively long time (e.g., a few weeks) without any further power being supplied. If the display is segmented accordingly, in this way, letters, numbers or images, for example, can be created with relatively high resolution to display said information. However, such a reflective screen can also be implemented with the aid of other technologies, which are known by the term "electrowetting" or "MEMS" for example. As mentioned, the screen can, for example, be designed for rendering in black and white, for rendering in grayscale, and for rendering in black, white and red or also rendering in black, white and yellow. Future developments should also be included that enable rendering in full-colour or multiple colours. Such a screen is generally a reflective, i.e., passive, non-self-luminous screen in which the—relatively static—rendering of information is based on the fact that light generated by an external (artificial or natural) light source shines on the screen and is reflected from there to the viewer.

With the aid of the first NFC interface, the display unit is supplied with power, on the one hand, and with data that can represent commands for controlling the display unit or also image content on the other. During the power supply via the NFC interface, said data can also be transmitted via this NFC interface, which is processed by the display unit in such a way that the image content of your screen changes. After completion of the change of the image content, the display unit can also provide the corresponding status information via the NFC interface, which represents the successful change of the image content. After completion of the change of the image content, where applicable, also after submission of the status information, the power supply can be terminated via the NFC interface, after which the image content of the screen remains unchanged until the next desired change.

The use of these technologies allows above all the implementation of the shelf label, in particular, designed as a shelf-label display, without its own power supply such as a battery or a power pack for example, both of which are relatively expensive. Also, a conventional shelf label for the maintenance or renewal of the battery or power pack must be designed in such a way that these energy stores are interchangeable. Where applicable, only one capacitor or a plurality of capacitors are used in the shelf label for short-term temporary smoothing or stabilization of the internal supply voltage. The shelf label is therefore designed in such a way that its electronics, in particular, its electronic control system, is always only active for communication or for updating the screen content or for receiving user interaction or for measuring environmental parameters when it is supplied with the aid of the external electronic supply device. The housing can be completely and permanently encapsulated, because no replacement of the energy store is necessary so that it can only be opened for recycling purposes (e.g., using special tools).

Thereby, a shelf label can be reduced to a few absolutely required electronic components and can therefore also be extremely inexpensive to produce. This extremely reduced shelf label only needs to have a basic functionality, such as standardized NFC communication with a standardized power supply during NFC communication, which can be implemented with the aid of a commercially available NFC module. Updates of the screen of the power-saving display unit and status report regarding this are not done directly by the shelf-label display in a communication with an access point, as is the case with known systems, but are handled by the intermediary supply device, which, in turn, is in contact with the access point via a suitable (and essentially freely selectable) communication method, which is discussed in detail below. The same applies in an analogous way to the other aforementioned possible functionalities of the shelf label.

The supply unit is designed to transfer the power for the electrical supply of a shelf label, which is mounted on the shelf rail corresponding to the conductor loop, in a contact-free manner to the shelf label with the aid of the conductor loop. "Contact-free" here means that this is done with the aid of an inductive coupling between two adjacent localized conductor loops or coils. Thus, the shelf label can also have a conductor loop consisting of a single loop or a plurality of winds, i.e., a coil (as mentioned as a coupling coil). Furthermore, "corresponding to" means that the shelf label is positioned adjacent to the surface spanned by the conductor loop and is essentially located there within a zone limited by the conductor loop. The conductor loop itself can be formed in the plane of the shelf rail, e.g., visible, or can be covered or covered by a protective strip of material (here referred to as a wall).

In order to ensure a reliable attachment of the shelf label to the shelf rail, it is favourable that the first fastening structure of the shelf rail, in addition to the wall, comprises a first fastening groove formed at the head area and extends along the head area and comprises a second fastening groove formed at the foot area and extends along the foot area, and the fastening grooves are designed in such a way that a shelf label with its fastening elements can be inserted into them in a locking manner, and a back wall of the shelf label can is positionable to abut the shelf-label plane. Preferably, the two fastening grooves run parallel to each other. Corresponding to the position or mutual distance of the fastening grooves on its housing, the shelf label can comprise rails or strips as fastening elements, which can be inserted into the fastening grooves or snapped in there. Thus, the shelf label can be positioned optionally along the shelf rails and can even be moved if necessary.

Preferably, the formation or dimensioning as well as positioning of the fastening elements is chosen in such a way that the back side of the shelf label is flat on the shelf-label plane or only a few tenths of a millimetre away from it is positioned in the shelf label inserted into the shelf rail.

Here, it is favourable if the shelf label comprises a printed circuit board essentially forming its back side, on which the coupling coil is formed. This allows the coupling coil to be positioned as close as possible to the conductor loop at a defined distance from the conductor loop. Thus, optimized, defined and, above all, reproducible geometric conditions are created that promote reliable contact-free operation.

In this embodiment of the shelf label, it is favourable for the protection of the printed circuit board, or the coupling coil localized there if at least one outwardly orientated side of the printed circuit board is coated with a lacquer or a thin sticker, preferably protecting against electrostatic discharge.

Thus, if the shelf label is inserted into the shelf rail, the conductor loop or coupling coil installed in the shelf label is automatically located in the zone usable for inductive coupling between the two conductor loops or coils positioned next to each other. Preferably, in the case of the shelf label inserted in the shelf rail, the surfaces spanned by the two conductor loops or coils (on the one hand belonging to the shelf rail and on the other hand belonging to the shelf label) are orientated parallel to each other, because the shelf-label plane and the conductor-loop plane are also orientated parallel to each other and localized at a distance of less than one millimetre to a few millimetres. In order not to hinder the inductive coupling, the shelf rail itself is made of a suitable material, preferably being made of plastic.

For example, the circumference of the conductor loop of the shelf rail can extend along the entire length of the shelf rail and the entire height of the shelf rail. Preferably, however, the surface spanned by the conductor loop will be slightly smaller than the area of its front side defined by the physical dimensions of the shelf rail. Preferably, the at least one conductive loop is integrated into the wall of the shelf rail with the aid of the second fastening structure in such a way that it runs corresponding (adjacent) to the back wall of the shelf label, in particular, adjacent to the position of the coupling coil of the shelf label when the shelf label is inserted. For the implementation of the conductor loop, a single circumferential conductor path or a coil-like conductor path running around it multiple times, i.e., a conductor path comprising a plurality of winds, can be provided. The conductor loop comprises a loop connection at each of its two ends. The two loop connections are intended for contact with the supply device and are therefore accessible for this purpose.

The conductor loop can also be realized by a wire in the described configurations.

Preferably, the second fastening structure comprises two tubes running adjacently parallel to each other at a third distance, in particular, of about 1 cm, and running in the longitudinal direction of the shelf rail, each with an open end, which are designed in such a way that a wire creating the conductor loop is insertable into them in such a way that the wire at one end of the shelf rail connects the two tubes and, at the other end of the shelf rail, conductor-loop connections of the conductor loop are accessible for them to contact. The two tubes can be designed in such a way that they essentially grip the wire in such a positive-locking manner that it is held relatively precisely at its target position and can still be inserted or removed smoothly. In this embodiment, the conductor loop may consist of at least three essentially linear sections.

Preferably, the tubes have a dur knife of slightly less than 1 mm and the wire diameter is matched accordingly so that the wire can be easily inserted into the tubes.

The shelf rail can be equipped with a single conductor loop. However, it can also be favourable if along the longitudinal extension of the shelf rail a plurality of conductor loops is formed, each of which is coupled individually with the supply unit (as mentioned), and the supply unit for selective power transfer with the aid of each of the conductor loops is formed. This allows the choice of power supply for a single shelf label or a group of shelf labels. Depending on the implementation, for example, 2 or 3 or up to 15 or even significantly more conductor loops can be implemented along the shelf rail. These conductor loops are positioned next to each other along the longitudinal extension of the shelf rail and their two loop connections are led along the shelf rail to the supply device and electrically connected to it there. The longitudinal extension of the zone covered by the respective conductor loop on the shelf rail can be identical for all conductor loops. Thus, many closely spaced zones can be defined along the shelf rail, the respective longitudinal extension of which is based on the longitudinal extension of the shelf label used on the shelf rail, wherein the longitudinal extension usually comprises a few centimetres, such as 8-12 cm for example. This enables individual (selective) inductive coupling with each individual shelf label at (almost) any position along the shelf rail. This is an advantage if the positioning of the shelf label is to be as flexible as possible and nevertheless, an inductive coupling with each shelf label should be possible on an individual basis to the furthest extent possible. However, larger zones can also be provided in which a plurality of shelf labels can then be located, which can then enter into an inductive coupling together with the affected conductor loop. This configuration can be used if the exact position of the respective shelf label does not play any role. Such a case is given if, for example, a plurality of identical products are placed on a shelf over a longer section or the total length of the shelf and the same information about these products is always presented by several shelf-label displays placed at greater distances from each other along the longitudinal extension of the shelf rail. Along a shelf rail, however, there can also be mixed configurations of relatively short zones and relatively long zones.

The conductor loops can all be used together, i.e., simultaneously, for power transmission from the supply device. However, this means a correspondingly complex design for the electronics of the supply device. Therefore, it has been proven to be particularly favourable if the supply unit for multiplexing the power transmission over the conductor loops is formed. Only a single conductor loop, which is electronically selected, is used for power transmission.

As already discussed in an analogous way in connection with the shelf label, the supply device can be designed differently with regard to its interface suitable that is for power transmission. Preferably however, the supply unit is formed as a second NFC interface for the contact-free power supply of a shelf label, wherein the at least one conductor loop is a component of the NFC interface intended for contact-free power transmission (as well as for contact-free communication).

In general, it can be stated here that the conductor loop therefore implements an inductance that is used for inductive coupling with the corresponding inductance on the side of the shelf label.

Furthermore, the at least one conductor loop can be integrated into the shelf rail with the aid of the second fastening structure or attached to it. The integration into the shelf rail is favourable if, for example, the shelf rail is made of plastic and the conductor loop is already integrated there during injection moulding for example, meaning during the production of the shelf rail. However, the conductor loop can also be attached to the surface of the wall of the shelf rail, for example, by gluing it on. In particular, if many conductor loops, which are arranged next to each other, are required and accordingly many supply lines are also to be taken into account, it has been proven favourable if the conductor loop(s) is (are) formed on a printed circuit board. This printed circuit board can then be integrated into the shelf rail as a separate component or attached to it. Also, the shelf rail can be designed in such a way that the printed circuit board is interchangeable so that it is easily possible to respond to a wide variety of requirement profiles in shelf planning with a wide variety of conductor loop configurations, which can be implemented, for example, on a single circuit board or on different printed circuit boards. Also, the shelf rail itself can have a conductor loop holder. This can be designed in such a way that it is located, for example, on the front side of the shelf rail, i.e., where the back side of the shelf label is positioned as close as possible to the shelf rail in the state attached to the shelf rail. However, the conductor loop holder can also run corresponding to the area of the shelf rail where the shelf label can be attached on the back side of the shelf rail, in particular, on the back side of the wall of the shelf rail, which can bring better accessibility of the conductor loop for maintenance purposes or also ensure unsurpassable protection against damage. Ultimately, the conductor loop there is also hidden from the eyes of the customers of a supermarket. Structurally, the conductor loop holder can be implemented, for example, by means of a gap-shaped or channel-shaped recess or, as mentioned, tubular formation in the plastic material of the shelf rail for example, into which recess the conductor loop is inserted. Thereby, the shape of the conductor loop as well as its exact position can be defined as precisely as possible without further measures (such as the previously mentioned printed circuit board and its positioning for example). Also, the conductor loop positioned on the back can be electrically connected in a conductive manner to an electronics of the supply device at virtually any point without having to take into account the position of the shelf labels positioned on the front of the shelf rail. The recess can also comprise a snap or fixation mechanism that fixes the conductor loop in its target position. Also, the recess can be formed in such a way that it can hold a plurality of winds of the conductor loop, wherein these can be arranged next to each other and/or on top of each other in the recess.

Also, when integrating a conductor loop holder directly into the shelf rail (i.e., into its material), one is not bound to the limits of the manufacturing process for printed circuit boards during planning or production of the conductor loop and can therefore also implement conductor loops with a length that far exceed those for printed circuit boards of currently about one metre. It is therefore also possible to produce a conductor loop that extends along an entire shelf rail, which can be several metres long.

It has been proven to be particularly favourable if exactly one electronic supply device is used per shelf rail. This allows a focused power supply to be produced only for this one shelf rail.

In this context, it has also been proven to be particularly favourable if the electronic supply device is integrated into the shelf rail or attached to it. Therefore, a shelf rail with individual electronic power supply can be produced. The supply device can, for example, also be directly formed on the printed circuit board or be connected to it as a module or be mechanically coupled as a module with the shelf rail and be electrically connected in a conductive manner to the conductor loop of the shelf rail. As a result, the shelf rail as a whole, including its supply device, can be withstood and easily put back into operation at another location.

It has been proven to be particularly favourable if the shelf rail comprises a fourth fastening structure which is used for fastening a supply device for the contact-free power supply of at least one shelf label using at least one conductor loop, wherein the fourth fastening structure is designed between the second and the third fastening structure in such a way that the supply device at an (lateral, meaning left or right) end area of the shelf rail is insertable between the wall of the shelf rail and the conductive structure that is attachable with the aid of the third fastening structure in such a way that conductor-loop connections of the conductor loop available there can be contacted with the supply device. The conductor-loop connections intended for contacting or also additionally provided contacting elements, such as surfaces, can be orientated at an angle, in particular 90° in relation to the parts of the conductor loop running straight along the shelf rail. This can contribute to securing the conductor loop in its target position, in particular, to securing the conductor-loop connections in their target position.

In order to enable reliable contacting of the conductor-loop connections within the shelf rail, meaning in an environment protected by the shelf rail, it is favourable if the electronic supply device comprises contacting elements, in particular, spring-loaded contact pins, for establishing an electrically conductive connection with the conductor-loop connections, and the contacting elements are positioned in such a way that they contact the conductor-loop connections when the conductor loop and the supply device are in their target position in the shelf rail.

On the one hand, this enables easy assembly of the shelf rail with the corresponding supply device, wherein the laterally positioned supply device with its housing can simultaneously terminate the shelf rail laterally and, if necessary, can be connected there with other electronic devices via a cable without additional openings on the shelf rail being necessary for the passage of a cable. Even in the event that the supply device is to be accessible via radio technology, the positioning of the supply device at the edge of the shelf rail has been proven to be favourable. Thus, the supply device can be positioned, for example, a few millimetres up to about one centimetre from the shelf rail so that the part protruding from the shelf rail is no longer shielded by the conductive structure and can therefore be transmitted in an unhindered manner by means of a radio module that is integrated there.

The power supply of the supply device can be implemented in different ways. For example, the supply device can be implemented via an Ethernet cable that connects the supply device with other communication devices, wherein the supply voltage is also provided via this Ethernet cable. However, a separate supply station (e.g., a power supply unit) can also be provided for the power supply of the electronic supply devices. Preferably, this supply station supplies a group of electronic supply devices, particularly preferably for a whole shelf, in particular, for a group of shelves. This allows the modular construction of a supply infrastructure for a single shelf or for geographically or thematically sorted groups of shelves or even just the reduction of the number of supply stations to a necessary minimum.

Being particularly preferred however, the electronic supply device can be supplied with power in a radio-based manner and the supply station is, in turn, designed as a radio power source for the radio-based and, in particular, directed supply of power for the electronic supply unit. With the aid of the supply station, a contact-free targeted power transfer to the supply device takes place. This enables an essentially cable-free supply infrastructure of on the one hand the shelf labels attached to the shelf rail and on the other hand also the supply device intended for the supply of the shelf labels. In fact, the installer of the system saves the wiring between the actual power source and the respective shelf. This circumstance allows an essentially random positioning of the shelves in the store as well as the random and simple positioning of the shelf rails on various shelves as well as their exchange between the shelves. This type of power transfer, as well as the underlying technology, is known as "Power over WiFi". Radio power sources equipped with this technology can be installed, for example, on the ceiling of a business premises and selectively supply, within a radius of up to 10 metres, the supply devices assigned to the respective shelf rails there and localized within this radius with the aid of powerful focused radio signals directed at them.

Furthermore, the electronic supply device can also be designed for contact-free communication with the shelf label using the technology that is also used for power transfer to the shelf label. Preferably, the already mentioned NFC technology is used again. This allows the best possible use of the available electronic components for both contact-free power transmission as well as contact-free communication over relatively short distances, as is the case with shelf labels attached to the shelf rail.

In addition to the NFC interface, which is intended for communication with the shelf labels, the supply device comprises another interface intended for communication with an access point. This additional interface can be designed for radio communication. For radio communication with the access point, a time slot communication method, in particular a proprietary time slot communication method as it is known from WO2015/124197, pages 2 to 4, the specific disclosure of which is hereby incorporated by reference. For radio communication, however, a communication protocol based on the standards or specifications ZigBee, Bluetooth or WiFi, etc. can also be used. However, the second interface can also be designed for wired communication, so that communication can take place via an Ethernet cable. As mentioned, the required supply voltage can also be supplied via the Ethernet cable, which is known in professional circles under the term "Power over Ethernet", abbreviated "PoE".

From a communication point of view, the supply device thus implements a "gateway" for the entirety of the shelf labels mounted on the shelf rail in question.

The access point serves as a superordinate interface between the shelf labels of an IT infrastructure controlling the shelf labels, such as servers with corresponding software applications and the like for example. Typically, in a radio-based system, a group of shelf labels is assigned to such an access point in terms of radio technology (logical), so that communication with this group of shelf labels only takes place via this access point. In a business premises of a supermarket, for example, a plurality of such access points can be installed, wherein each access point is intended for communication with shelf labels logically assigned to it, which are located in a geographical (radio-technically accessible) area around it.

In addition to this functionality, the access point can also have the supply station, which is designed for the directed, radio-based power supply of the electronic supply device.

In summary, the supply device implements a combined power supply and communication supply device for the shelf labels attached to the relevant shelf rail for the shelf rail in question. Thereby, the supply device is configured or designed for local contact-free power transmission as well as local contact-free communication with shelf labels attached to the shelf rail. Such a supply device can also be referred to as a shelf rail control device or shelf rail controller, because it controls all activities of the shelf labels mounted on the shelf rail in question, which includes both the display behaviour, the communication behaviour, as well as the respective power supply. The conductive structure with its attenuation characteristic generates an environment that can be reproduced for all shelf rails in such a way that a uniform coordination of the (antenna) oscillating circuit of the supply device is sufficient to carry out a contact-free power supply and subsequently contact-free communication at a wide variety of positions on a business premises and also under a wide variety of conditions prevailing there.

It has also been proven to be particularly favourable if the electronic supply device is designed for receiving and forwarding a unique identifier of the shelf label involved in the communication for the purpose of determining the position of the shelf label in question.

If a plurality of shelf labels are arranged within a conductor loop of the shelf rail or if several shelf labels are simultaneously supplied with power via a single conductor loop, precautions must be taken to ensure the receipt of the respective identifier. For this purpose, the shelf labels may, for example, be programmed to provide their identifier at randomly selected points in time within a time window (single or multiple) to ensure individual reception at the supply device. Likewise, an anti-collision method known e.g., from RFID technology can be used in this contact-free transmission to ensure individual reception at the supply device.

The forwarding of the unique identifier is preferably carried out to a data processing device, such as a server of the business premises for example, which carries out the communication with the individual electronic shelf labels.

The server can also store the logical link between products displayed on the respective shelf and the shelf-label displays positioned there, thus ensuring that the respective shelf-label display presents the information that belongs to the product in question.

The server is also informed about the position or extension of the respective conductor loop on the shelf rail and is informed by the supply device together with the identifier also about which conductor loop was used to obtain the identifier from the shelf label. This also allows three-dimensional digital maps of the positions of the entirety of the shelf labels on the premises of a business to be created. This applies both to the shelf labels configured to display information as well as, in an analogous way, to the other possible functionalities of the shelf label mentioned.

The application thus also reveals an "intelligent" shelf rail to which at least one electronic shelf label can be attached, and which comprises:
 at least one conductor loop formed on the shelf rail, and
 a supply device which is designed for the contact-free power supply of at least one shelf label, wherein the conductor loop is a component of the supply device and serves for the contact-free supply of a shelf label with power, which is mounted on the shelf rail corresponding to the conductor loop.

Preferably, the formation of the supply device for power supply can be implemented with the aid of an NFC interface, as has already been discussed, wherein the conductor loop is a component of the NFC interface.

The electronics of the various devices of the system as well as their interface etc. can be realized with the aid of various passive as well as active electronic components in a discrete as well as integrated way. Preferably, a microprocessor with corresponding peripheral modules or a microcontroller is also used, whereupon a software for the provision of the various functionalities is processed. So-called ASICs (Application-Specific Integrated Circuits) can also be used.

These and other aspects of the invention result from the figures discussed below.

BRIEF DESCRIPTION OF THE FIGURES

The invention is explained once again below with reference to the enclosed figures on the basis of exemplary embodiments, to which, however, the inventions is not limited. Thereby, identical components in the various figures are provided with identical reference numbers. Schematically, the figures show.

DESCRIPTION OF THE EXEMPLARY EMBODIMENTS

Figure 1:
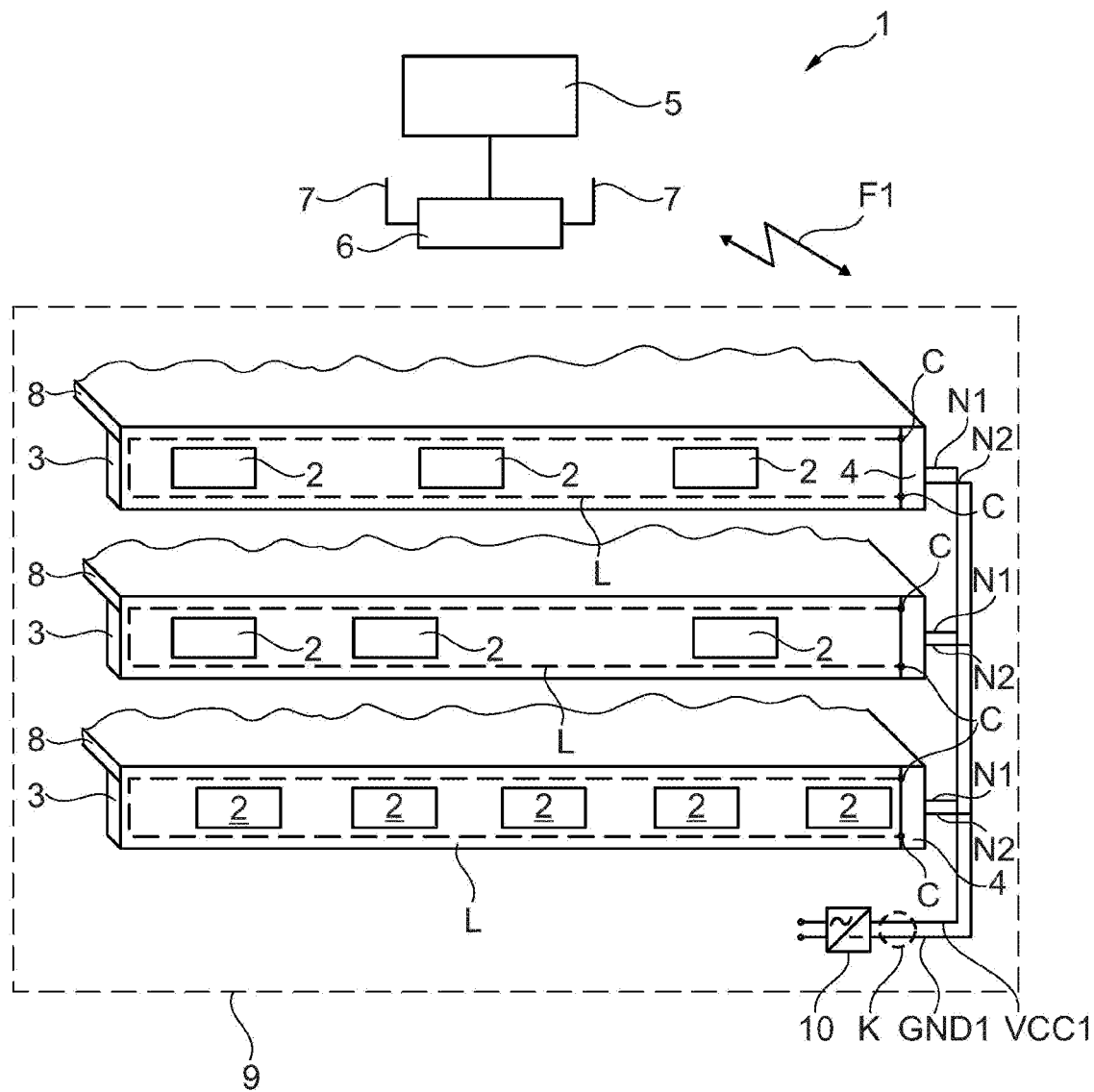
FIG. 1 an electronic shelf-label system according to the invention in accordance with a first exemplary embodiment.

In FIG. 1, a shelf-label system 1 is shown, which comprises a number of identically designed electronic shelf labels implemented as shelf-label displays 2, which are attached to three—"intelligent"—shelf rails 3 according to the invention. Each shelf rail 3 comprises an electronic supply device 4, which is inserted laterally into it. Also shown is a data processing device, which is implemented with the aid of a server 5, which is wire-connected to an access point 6, which comprises two antennas 7 as an example. The supply devices 4 shown are in radio contact with the access point 6 via the first radio signals F1. This allows the image contents of the shelf-label displays 2 to be changed from server 5, and, where applicable, associated status information can also be queried from the shelf-label displays 2 and transmitted to server 5. Each of the shelf rails 3 is mounted on an individual shelf 8 on its leading edge. The three shelves 8 shown all belong to a shelf 9, which is only very schematically indicated. Various products can be placed on shelf 8, but they are not shown in the present case.

For the electrical supply of the supply devices 4, a separate power supply 10 assigned to shelf 9 is provided as a supply station, which converts an input-side mains alternating voltage (from 230 V for example) to a DC voltage suitable for the supply devices 4 as the first supply voltage VCC1 (of 12 V for example) compared to a first reference potential GND1. This first supply voltage VCC1 is supplied to the supply devices 4 with the aid of a cable K via their supply connections N1 and N2.

The supply devices 4 are shown schematically on the right edge of the shelf rails 3, but this does not necessarily have to be the case. In this way, they can also be in other positions along shelf rail 3. In the present case, the supply devices 4 are integrated into the shelf rails 3, for example, installed or inserted within a shaft (not shown here, but see FIG. 7).

Furthermore, FIG. 1 shows a single conductor loop L integrated into the shelf rail 3, which is connected to the supply device 4 installed there with its two loop connections C. The shelf rails 3 support the shelf-label displays 2.

The shelf rail 3, like the shelf-label display 2, is designed in such a way that the shelf-label display 2 can be inserted from the front into the shelf rail 3 and locked with it via a snap mechanism in such a way that it can only be removed from the shelf rail 3 with considerable effort. At the same time, the aforementioned mechanism allows the shelf-label display 2 to be moved along the shelf rail 3 with relatively little effort and can therefore be easily placed in any position. A snapping mechanism of the described species is known, for example, from WO2017/153481A1, FIG. 2. However, the mechanism can also be designed differently, which will be discussed in detail below.

Figure 2:
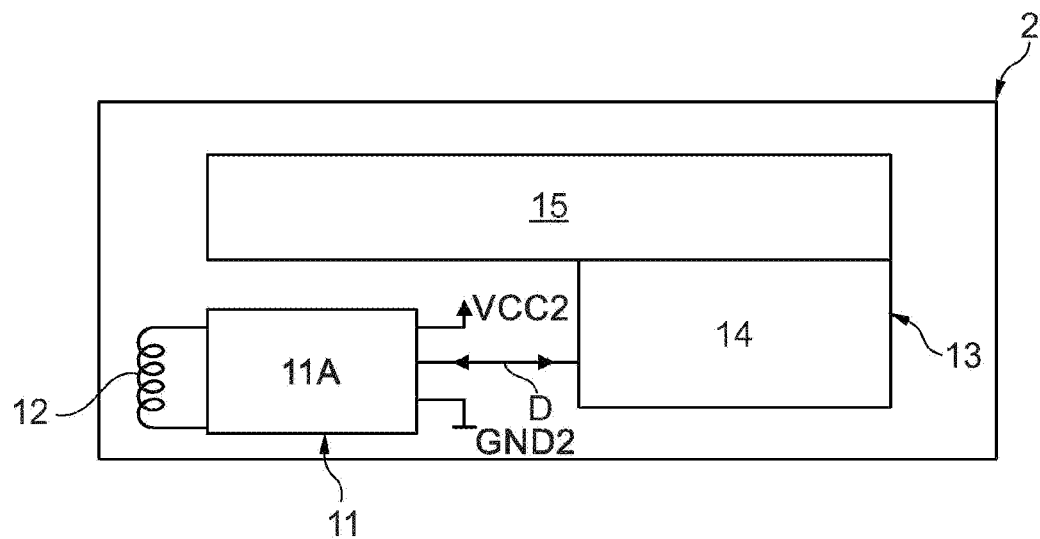
FIG. 2 a block diagram of a shelf-label display.

In the following, a block diagram of the shelf-label display 2 based on FIG. 2 is explained.

The block diagram shows a first NFC interface 11 with its coupling coil 12. With the aid of the coupling coil 12, an inductive coupling with another NFC-capable device, in this case, the supply device 4, specifically with the conductor loop L formed there, can be established if the coupling coil 12 is brought correspondingly close (a few tenths of a millimetre to about 4 millimetres) to the conductor loop L, which is the case with the shelf-label display 2 attached to one of the shelf rails 3. During inductive coupling, a second supply voltage VCC2 (compared to a local second reference potential GND2) is generated with the aid of the NFC interface 11 for the operation of the entire shelf-label display 2, which activates the electronics or first electronic circuit 11A of the shelf-label display 2 in such a way that contact-free bidirectional communication of data D via its first NFC interface 11 is also feasible. Part of these electronics 11A is also an NFC controller, which provides the entire NFC functionality, but is not shown in detail here, but is integrated in the first NFC interface 11.

The block diagram also shows a display unit 13 connected to the first NFC interface 11, which is divided into an electronic paper display controller 14 and a controllable electronic paper display screen 15. With the aid of the controller 14, the received data is interpreted, where applicable, the image contents of the screen 15 are changed accordingly or also status information in the form of data D is transmitted to the supply device 4 via the first NFC interface 11.

Figure 3:
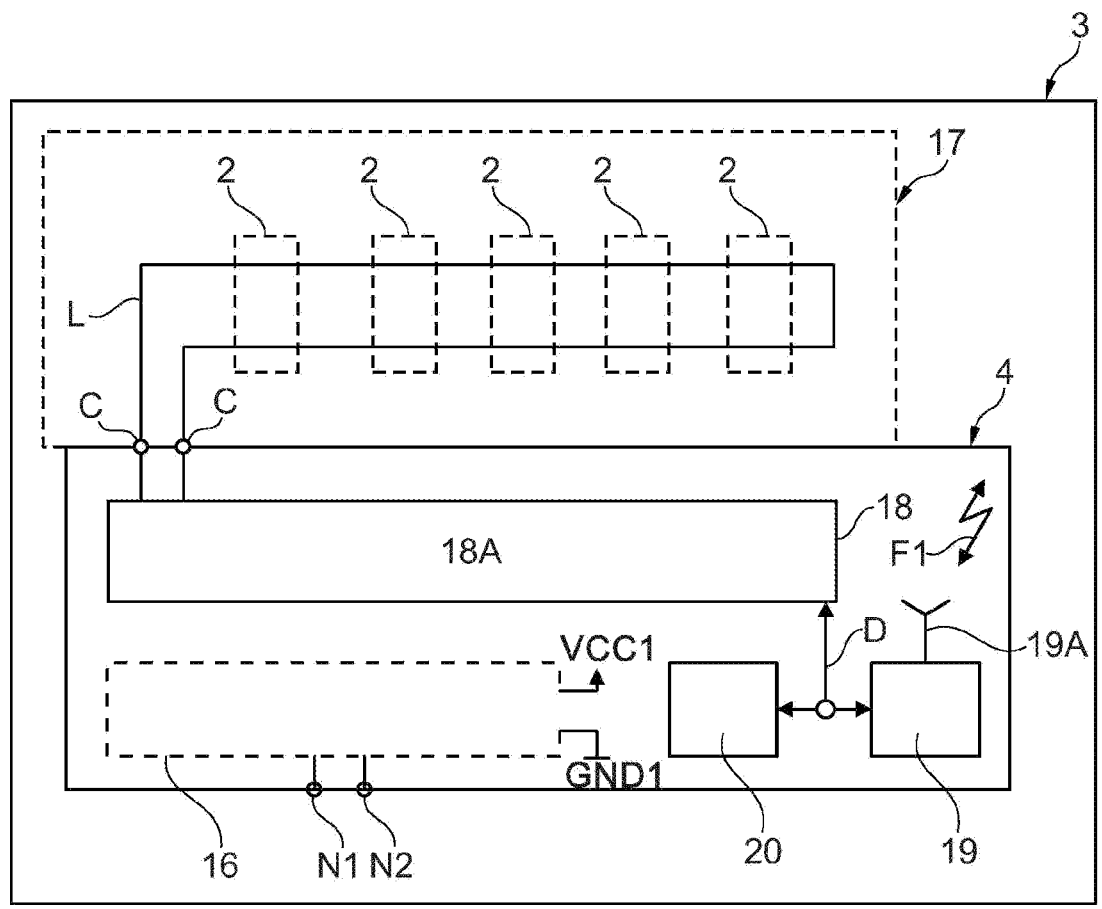
FIG. 3 a block diagram of a shelf rail with a supply device.

In the following, on the basis of FIG. 3, a block diagram of the shelf rail 3 in accordance with FIG. 1, in particular, also the supply device 4, is explained.

As mentioned, the (first) supply voltage VCC1 required for operation is supplied via the supply connections N1 and N2. In the event that no external power supply 10 (see FIG. 1) is used, but the mains AC voltage is supplied directly, the supply device 4 can also have its own internal power supply 16, which is indicated in the present case with a broken line.

Here, the shelf rail 3 carries the conductor loops L attached directly to it.

Corresponding to the position of the conductor loop L, the shelf-label displays 2 positioned there, in this case, five pieces in accordance with the lowest shelf rail of FIG. 1, are also indicated. In contrast to FIG. 1, the electrical connection of the loop connections C to the supply device 4, specifically to an electronic supply unit, which is implemented as a (second) NFC interface 18 with a second electronic circuit 18A, is also shown. This second NFC interface 18 also comprises its own NFC controller (not shown). The second NFC interface 18 is designed with an inductive coupling to the first NFC interface 11 of the shelf-label display 2 for the contact-free transmission of electrical power to the shelf-label display 2 and for bidirectional communication of data with the shelf-label display 2 activated by power supply.

The supply device 4 also comprises an access-point communication interface 19, which is designed for radio-based communication with the access point 6 shown in FIG. 1. The access-point communication interface 19 comprises electronics (not shown in detail) designed for this purpose and an antenna configuration 19A, which can also comprise a plurality of antennas. The supply device 4 comprises a control unit 20 for controlling the internal processes, the power supply of the shelf-label display 2, the communication with the shelf-label display 2, as well as the communication with the access point 6. The control unit 20 is produced with the aid of a microcontroller, which is connected via a bidirectional data bus to the second NFC interface 18 and the access-point communication interface 19.

Figure 4:
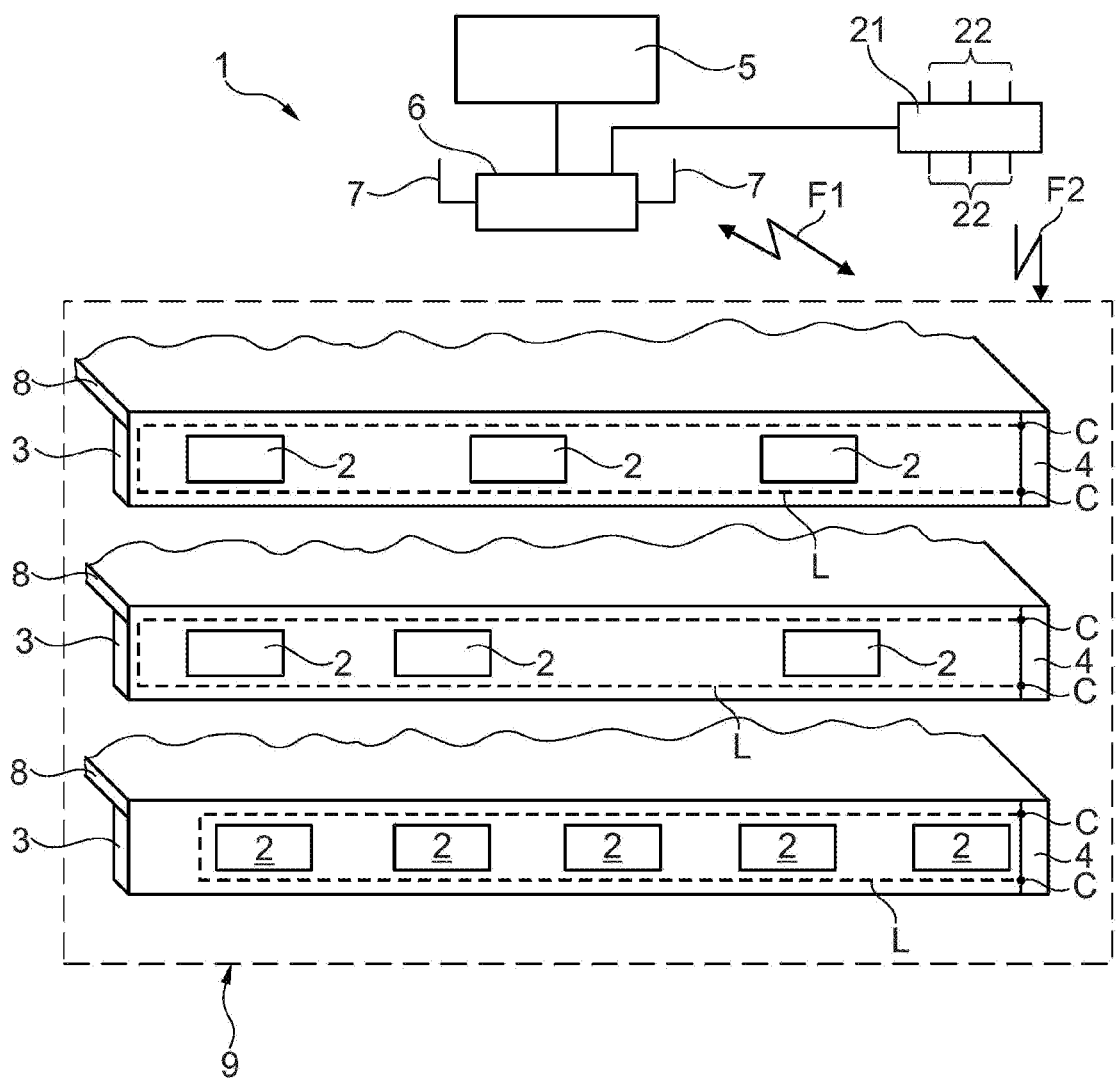
FIG. 4 a second embodiment of the shelf-label system.

Another embodiment of system 1 is shown in FIG. 4. In contrast to the system 1 shown in FIG. 1, the power supply 10 is missing here. In the present case, the supply of the individual supply devices 4 with electrical power is carried out with the aid of a supply transmitter 21 (also referred to as a radio power source) as a supply station, which is designed to transmit electrical power to a receiver (i.e., one of the supply devices 4) with the aid of a focused or directed (second) radio signal F2 with a certain transmission power, such as 5 W for example. Such a supply transmitter 21 also comprises a plurality of antennas 22 (six pieces are shown here), with the aid of which the direction of the power transmission (ultimately the propagation of the second radio signal F2) is adjustable at a relatively precise level so that the power transmitting second radio signal F2 arrives precisely at the respective supply device 4. This power transfer is known as "Power over WiFi".

Figure 5:
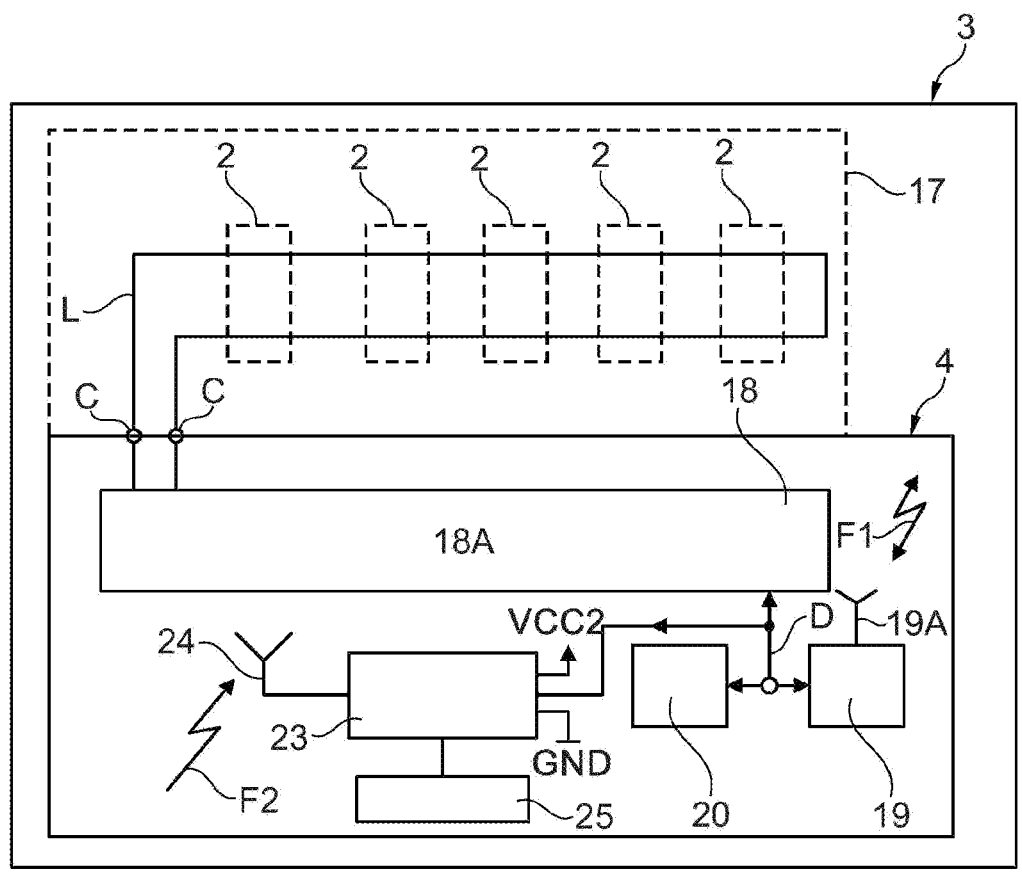
FIG. 5 a second exemplary embodiment of the shelf rail.

In order to be able to use this type of power transmission, the supply device 4 used in the exemplary embodiment of FIG. 5 comprises a supply receiver 23 suitable for receiving the second radio signal F2, which is equipped with its antenna configuration 24 (which may have a plurality of antennas) and electronics (not shown in detail), which are designed to receive the second radio signal F2 and to store the power transmitted therewith in an internal electrical energy store 25 (rechargeable battery, power pack) and thus to generate the second supply voltage VCC2 compared to a second reference potential GND2.

In operation, the supply submission 4 can, for example, query or monitor the state of charge of the energy store 25 with the aid of its control unit 20. As soon as the state of charge drops below a certain level, the control unit 20 can request a (re-)charge with the aid of the first radio signal F1. This demand is received by the access point 6 and, depending on the implementation, it can be forwarded directly to the supply transmitter 21 or, taking the server 5 into consideration, to the supply transmitter 21. Since, within the system 1 (e.g., the server 5), the exact geographical position (the three-dimensional coordinates) of each of the supply devices 4 as well as their unique identifier are known, the supply transmitter 21 can send out the second radio signal F2 precisely directed to the position of the respective supply device 4 demanding charging. There, the second radio signal F2 is received, and the power transmitted with its aid is used to charge the internal energy store 25 there.

The shelf rail 3 described here is therefore designed for contact-free communication with the shelf-label displays 2 installed on it and an access point 6 assigned to it via radio technology and it is designed for contact-free power supply in the sense of energy storage for its own operation, as well as for the power supply of the respective shelf-label display 2, while the said shelf-label display 2 is in a communication state and/or in an update state of its screen 15 or, in general, their electronics are active.

At this point, it should also be mentioned that the supply transmitter 21 can also be installed in the access point 6.

Figure 6:
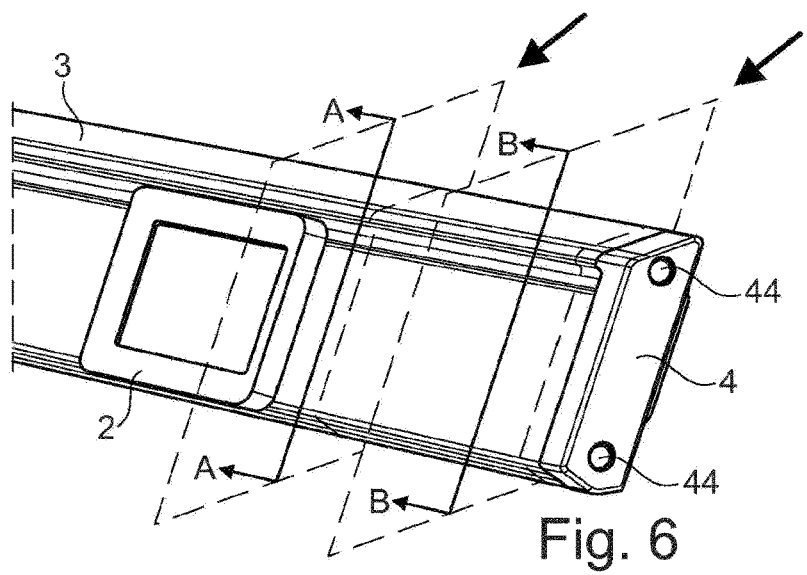
FIG. 6 a perspective view of a shelf rail with a supply device.

FIG. 6 shows a shelf rail 3 with the shelf-label display 2 attached to it and the supply device 4 inserted into the side of the shelf rail 3. This shelf rail 3 comprises a length of about 3 metres, a height of about 4.5 cm and a thickness of 1.2 cm.

Figure 7:
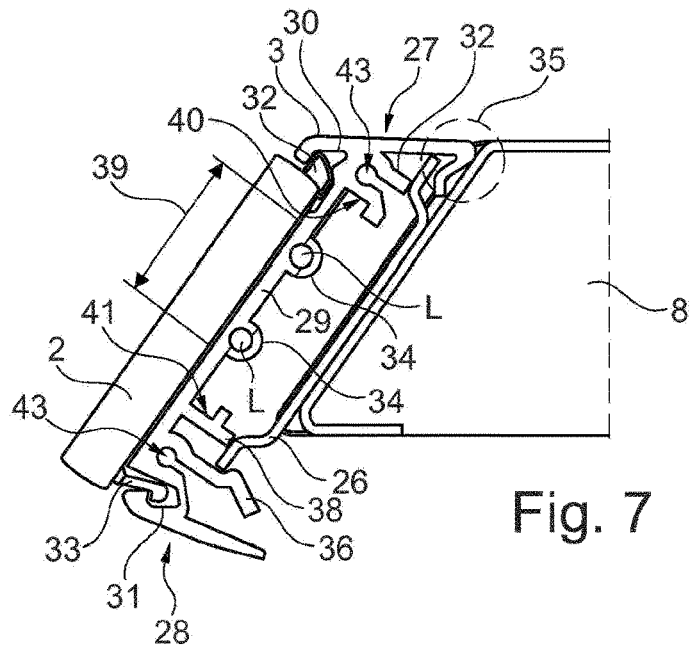
FIG. 7 a cross-section of the view in accordance with FIG. 6 along the cross-sectional surface A-A.

FIG. 7 shows a cut through shelf rail 3. In accordance with the cross-sectional surface A-A drawn in FIG. 6, this cut runs transversely (normally on the front side of the shelf rail 3) through the shelf rail 3. Furthermore, in contrast to FIG. 6, a front part of a shelf 8 is also visible, to which the shelf rail 3 is attached with the aid of a top-hat DIN rail 26 made of metal. The top-hat DIN rail 26 forms a conductive structure for the generation of defined attenuation ratios for contact-free power transfer from the supply device 4 to the shelf-label display 2, as well as for contact-free communication between the supply device 4 and the shelf-label display 2. The top-hat DIN rail 26 can be connected to shelf 8 by gluing, riveting, clamping, plugging or screwing, etc., but this is not discussed in more detail in the figures.

The shelf rail 3 comprises a first fastening structure for attaching the shelf-label display 2. The first fastening structure comprises a wall 29 running between a head area 27 and a foot area 28 of the shelf rail 3. Analogous to the head and foot area 27, 28, the wall 29 also runs along the entire shelf rail 3 and forms a shelf-label plane on its wall front side orientated towards the shelf-label display 2, on which the shelf-label display 2 is essentially flush with its back wall. The first fastening structure comprises, in addition to the wall, a first fastening groove 30 formed at the head area 27 and extending along the head area 27 and a second mounting groove 31 formed at the foot area 28 and extending along the foot area 28. The fastening grooves 30 and 31 are designed in such a way that the shelf label 2 with its fastening elements 32 and 33 can be inserted locking into them in such a way that the back wall of the shelf label 2 is positioned adjacent to the shelf-label plane. Accordingly, the fastening elements 32 and 33 are positioned and formed and the housing of the shelf label 2 is dimensioned or shaped.

The shelf rail 3 also comprises a second fastening structure for fastening the conductor loop L. The second fastening structure also comprises the wall 29, wherein two tubes 34 are formed on the wall back side. The two tubes 34 are aligned parallel to each other and run at a defined distance of about 1 cm from each other localized along the entire length of the shelf rail 2. Their two central axes define a conductor-loop plane that runs parallel to the shelf-label plane at a defined first distance of about 2.5 millimetres. The wall 29 comprises a thickness of about 2 millimetres and the tubes 34 are at least partially set into the wall 29, which allows for there to be a small distance between the conductor-loop plane and the shelf-label plane without the load capacity of wall 29 suffering unnecessarily.

The shelf rail 3 also comprises a third fastening structure for fastening the top-hat DIN rail 26. The third fastening structure comprises two substructures, which are formed, on the one hand, on the head side in a hanging device 35 for suspending the shelf rail 3 and, on the other hand, on the foot side in a lip of a snap-in mechanism 36 for snapping in.

The third fastening structure also comprises a first spacer element 37 positioned at the head area 27 and a second spacer element 38 positioned at the foot area 28. The two spacer elements 37 and 38 are used to fix and maintain a defined second distance of the top-hat DIN rail 26 from the conductor-loop plane, wherein, here, an essentially parallel orientation of the flat structure of the top-hat DIN rail 26 to the conductor-loop plane is also implemented. The two spacer elements 37 and 38 are essentially orientated at an angle of 90° away from the wall back side and extend from the wall 29 to the top-hat DIN rail 26, where they come into contact with the top-hat DIN rail 26 and ensure the target position. In the present case, the top-hat DIN rail 26 is positioned at the second distance of about 7 millimetres from the conductor-loop plane. The top-hat DIN rail 26 itself comprises a thickness of about 1 millimetre. Its height is about 2.5 cm and, its edges which abut the top-hat DIN rail 26 and are offset by 3 mm in hat-brim-like manner then extend about 5 millimetres long on the head side and on the foot side, with which edges the interaction with the plastic body of the shelf rail 3 takes place. The length of the top-hat DIN rail 26 corresponds approximately to the length of the shelf rail 3.

Furthermore, in FIG. 7, the outer extension of the coupling coil 12 formed on the back wall of the shelf-label display 2 is incorporated by means of dimension 39. Here it is clearly visible that the coupling coil lies flat on the shelf-label plane and is arranged there corresponding to and even overlapping with the spatial extension of the conductor loop L measured in the direction of the height of the shelf rail 2.

The shelf rail 3 also comprises a fourth fastening structure, which serves to fasten the supply device to insert and fix the supply device at an end area (left or right end) of the shelf rail 3 between the wall 29 of the shelf rail 3 and the top-hat DIN rail 26 attached with the aid of the third fastening structure in such a way that the available conductor-loop connections C of the conductor loop L are contacted with the supply device 4. For this purpose, the fourth fastening structure comprises a first insertion channel 40 formed on the wall back side below the first spacer element 37 and open to the foot area 28 and a second insertion channel 41 formed on the wall back side above the lip of snap-in mechanism 36 and open to the head area 27. In the two slide-in channels 40 and 41, the supply device 4 with its mounting rails 42 can be inserted, which are visible in FIG. 8. In addition, the fourth fastening structure comprises a round opening 43 located at the head-side end of wall 29 and a round opening 43 located at the foot end of the wall 29, into which fastening screws 44 (see e.g., FIG. 6 but also 9 and 10) can be screwed in from the side of the shelf rail 3 for screwing on the supply device 4 to the shelf rail 3.

Figure 8:
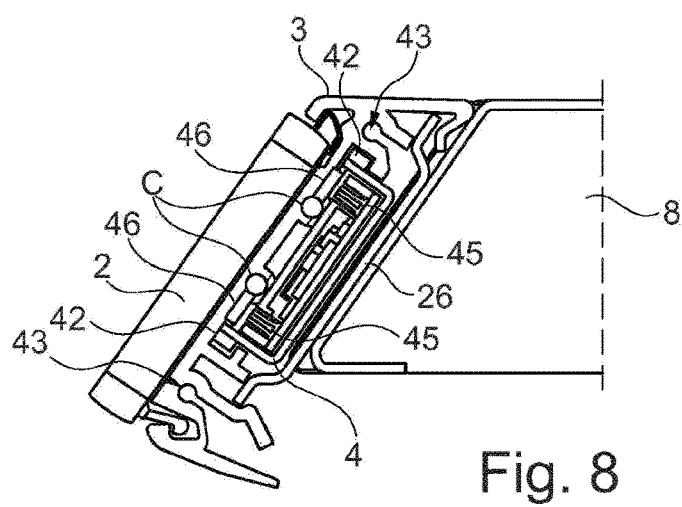
FIG. 8 a cross-section of the view in accordance with FIG. 6 along the cross-sectional surface B-B.

FIG. 8 shows a section through the shelf rail 3 in accordance with the cross-sectional surface B-B shown in FIG. 6, which is orientated transversely (normally aligned to the front side of the shelf rail 3) through the shelf rail 3 and runs to the right of the cross-sectional surface A-A at that point of the shelf rail 3, where contact elements 45 of the supply device 4 are formed. For the sake of improved clarity, the plurality of reference numbers that do not directly concern the attachment of the supply device 4 have been hidden in FIG. 7.

Furthermore, in the present case, two contact surfaces 46 are provided, wherein each of the contact surfaces 46 is soldered to one of the loop connections C. The contact surfaces 46 are contacted with the contact elements 45 formed as spring contacts when the supply device 4 is completely inserted into the shelf rail 3, meaning when this is positioned in the target position, thereby being contacted in such a way that a connection with the conductor loop L is established and this can be used as part of the second NFC interface 18. In contrast to this embodiment, however, the contact surfaces 46 can be dispensed with in the case of positioning of the contact elements 45 closer, and the wire forming the conductor loop L can be contacted directly at the end areas of the wire provided as conductor-loop connections C.

It should also be mentioned that, at the other end of the shelf rail, more precisely at the other end of the tubes 34, the wire of the conductor loop L runs as a single piece from one tube 34 to the other tube.

Figure 9:
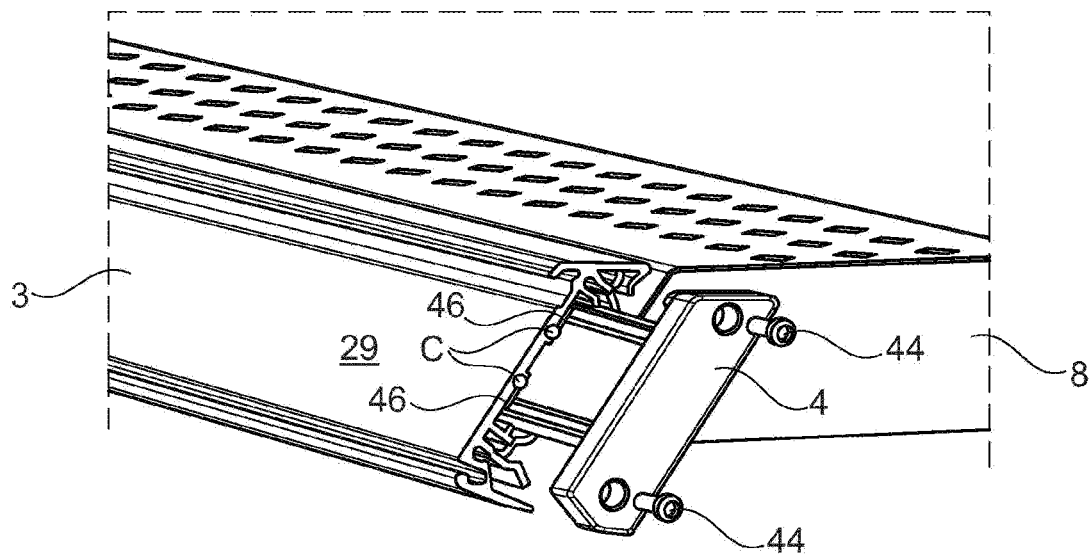
FIG. 9 a view of the shelf rail with only partially inserted supply device.
Figure 10:
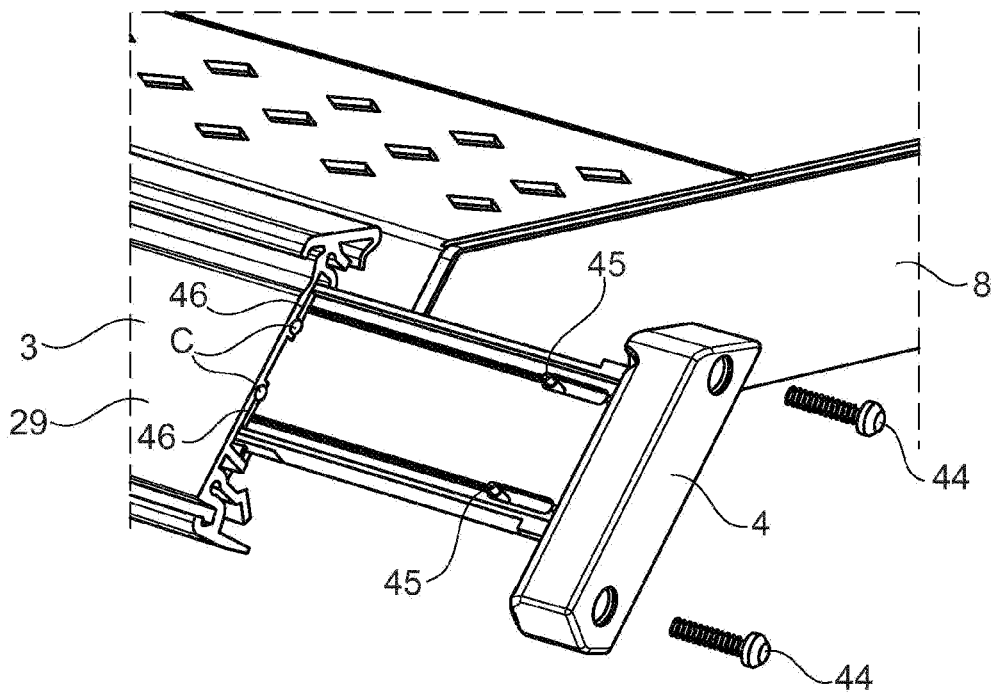
FIG. 10 the view similar to FIG. 9 with contacting elements of the supply device.

Finally, FIGS. 9 and 10 are explained, wherein FIG. 9 shows an illustration of a supply device 4, which is only slightly pulled out of shelf rail 3, and FIG. 10 also shows the contacting elements 45 in a slightly modified illustration. Here, the vast majority of reference numbers were also omitted in order not to clutter the illustrations.

In conclusion, it is again pointed out that in the case of the figures described above in detail, these only have to do with exemplary embodiments that can be modified by the person skilled in the art in various ways without leaving the scope of the invention. For the sake of completeness, it is also pointed out that the use of the indefinite articles "on" or "one" does not exclude that the respective features can also be present a multiple of times.

The invention claimed is:

1. A shelf rail for an electronic shelf-label system, comprising:
a first fastening structure configured to attach the shelf rail to at least one electronic shelf label that is suppliable with power in a contactless way, wherein the first fastening structure comprises a wall running between a head area and a foot area of the shelf rail with a wall front side and a wall back side, wherein the wall front side defines a shelf-label plane to position the at least one electronic shelf label along the wall, and
at least one second fastening structure on the wall back side, wherein the at least one second fastening structure is configured to fasten at least one conductor loop on a conductor-loop plane, wherein the conductor-loop plane is aligned parallel to the shelf-label plane and runs at a first distance from the shelf-label plane, and
a third fastening structure configured to fasten a conductive structure at a second distance from the conductor-loop plane,
wherein the third fastening structure comprises a first substructure and a second substructure, between which the conductive structure is receivable, wherein the first substructure runs along the head area of the shelf rail and the second substructure runs along the foot area of the shelf rail.

2. The shelf rail according to claim 1, wherein the third fastening structure is designed in such a way that the conductive structure is receivable with a height that covers at least an entirety of the at least one conductor loop.

3. The shelf rail according to claim 2, wherein the conductive structure is receivable with a height that corresponds approximately with a height of the wall measured between the head area and the foot area of the shelf rail.

4. The shelf rail according to claim 1, wherein the third fastening structure is along a length of the shelf rail and is designed in such a way that:

the conductive structure is insertable laterally into the shelf rail, or
the conductive structure is snappable into the third fastening structure at a pair of outer edges of the conductive structure.

5. The shelf rail according to claim 1, wherein the third fastening structure is configured to hold a plate-shaped conductive structure.

6. The shelf rail according to claim 5, wherein the plate-shaped conductive structure has protruding edges.

7. The shelf rail according to claim 1, wherein the third fastening structure is configured to hold the conductive structure along an entirety of the at least one conductor loop.

8. The shelf rail according to claim 7, wherein the third fastening structure is configured to hold the conductive structure along an entirety of the shelf rail.

9. The shelf rail according to claim 1, wherein the first fastening structure and the wall comprise:
a first fastening groove formed at the head area that extends along the head area, and
a second fastening groove formed at the foot area that extends along the foot area,
wherein the first fastening groove and the second fastening groove are designed in such a way that a shelf label with its fastening elements is insertable into them in a locking manner, and a back wall of the shelf label is positionable to abut the shelf-label plane.

10. The shelf rail according to claim 1, wherein the at least one second fastening structure comprises two tubes adjacent to each other at a third distance running in the longitudinal direction of the shelf rail, each of the two tubes having an open end, which are designed in such a way that a wire creating the at least one conductor loop is insertable into them in such a way that the wire connects the two tubes at an end area of the shelf rail and, at an other end area of the shelf rail, conductor-loop connections of the at least one conductor loop are accessible for the conductor-loop connections to be contacted by a supply device.

11. The shelf rail according to claim 1, wherein the first fastening structure is configured to attach to an electronic shelf label display.

12. The shelf rail according to claim 1, wherein the at least one second fastening structure is tubular or channel-shaped.

13. The shelf rail according to claim 1, wherein the third fastening structure is a planar structure.

14. A shelf rail for an electronic shelf-label system, comprising:
a first fastening structure configured to attach the shelf rail to at least one electronic shelf label that is suppliable with power in a contactless way, wherein the first fastening structure comprises a wall running between a head area and a foot area of the shelf rail with a wall front side and a wall back side, wherein the wall front side defines a shelf-label plane to position the at least one electronic shelf label along the wall,
at least one second fastening structure on the wall back side, wherein the at least one second fastening structure is configured to fasten at least one conductor loop on a conductor-loop plane, wherein the conductor-loop plane is aligned parallel to the shelf-label plane and runs at a first distance from the shelf-label plane,
a third fastening structure configured to fasten a conductive structure at a second distance from the conductor-loop plane, and
a fourth fastening structure configured to fasten a supply device for supply of the power in the contactless way of at least one of the at least one electronic shelf label using at least one of the at least one conductor loop, wherein the fourth fastening structure is positioned between the second and the third fastening structure in such a way that the supply device is insertable at an end area of the shelf rail between the wall of the shelf rail and the conductive structure, and the conductive structure is attachable via the third fastening structure in such a way that conductor-loop connections of the at least one conductor loop are contactable with the supply device.

15. An electronic shelf-label system comprising:

at least one shelf rail comprising:
- a first fastening structure configured to attach the at least one shelf rail to at least one electronic shelf label that is suppliable with power in a contactless way, wherein the first fastening structure comprises a wall running between a head area and a foot area of the at least one shelf rail with a wall front side and a wall back side, wherein the wall front side defines a shelf-label plane to position the at least one electronic shelf label along the wall,
- at least one second fastening structure on the wall back side, wherein the at least one second fastening structure is configured to fasten at least one conductor loop on a conductor-loop plane, wherein the conductor-loop plane is aligned parallel to the shelf-label plane and runs at a first distance from the shelf-label plane, and
- a third fastening structure configured to fasten a conductive structure at a second distance from the conductor-loop plane, the at least one electronic shelf label, which is attached to the shelf-label plane via the first fastening structure, wherein each of the at least one electronic shelf label comprises a first electronic circuit connected to a coupling coil for its contact-free power supply, the at least one conductor loop fixed in the conductor-loop plane via the at least one second fastening structure, a supply device inserted into the at least one shelf rail, which is electrically connected to the at least one conductor loop in a conductive manner via conductor-loop connections, wherein the supply device comprises a second electronic circuit configured to generate an alternating field to establish an inductive coupling between the at least one conductor loop and the coupling coil of the at least one electronic shelf label, and the conductive structure fixed by means of the third fastening structure, wherein the second electronic circuit is electronically tuned to environmental conditions defined by the conductive structure.

16. The system according to claim 15, wherein the first electronic circuit together with its coupling coil realizes a first NFC interface of the at least one electronic shelf label and wherein the second electronic circuit with the associated conductor loop realizes a second NFC interface of the supply device.

17. The system according to claim 15, wherein the supply device comprises contacting elements configured to establish an electrically conductive connection with the conductor-loop connections, and the contacting elements are positioned in such a way that they contact the conductor-loop connections when the at least one conductor loop and the supply device are in their target positions in the at least one shelf rail.

18. The system according to claim 17, wherein the contacting elements are spring-loaded contact pins.

19. The system according to claim 15, wherein the at least one electronic shelf label comprises a printed circuit board essentially forming its back side, on which the coupling coil is formed.

20. The system according to claim 19, wherein at least one outwardly orientated side of the printed circuit board is coated with a lacquer or a sticker protecting against electrostatic discharge.

* * * * *